Figure 1:
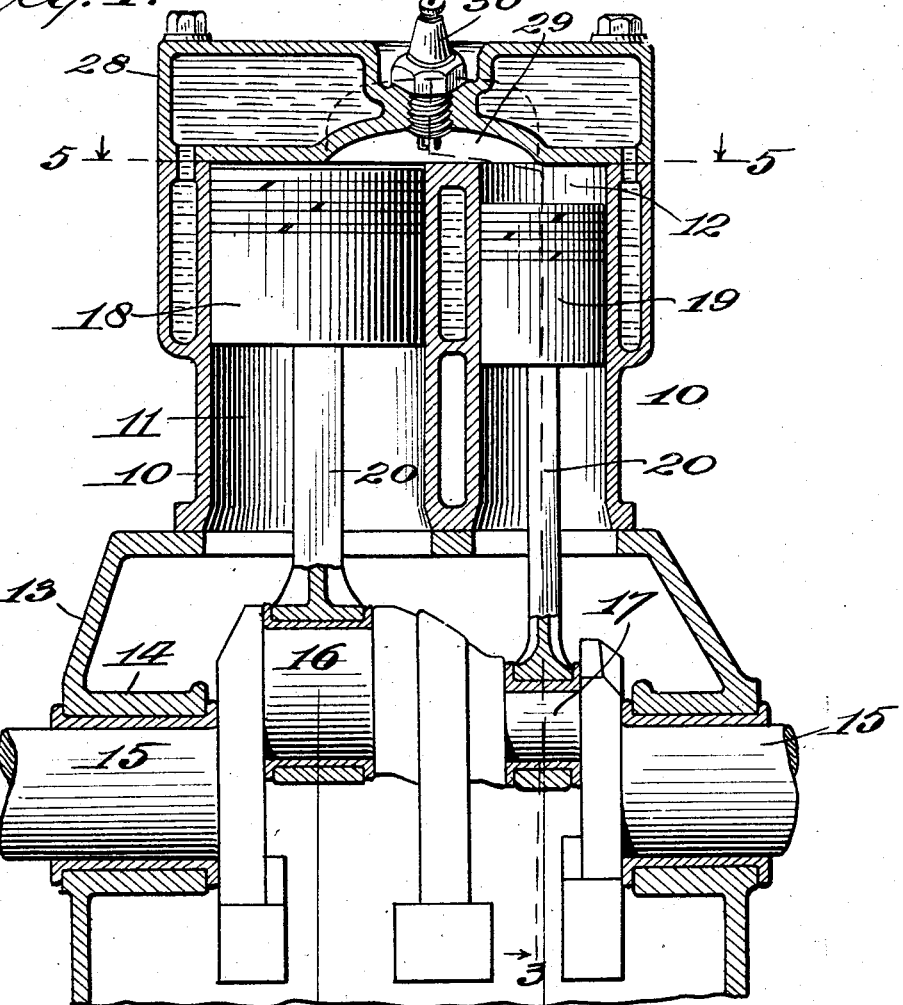

Aug. 16, 1927.

E. R. BURTNETT

INTERNAL COMBUSTION ENGINE

Filed Dec. 16, 1925

1,639,165

2 Sheets-Sheet 1

Inventor:
Everett R. Burtnett.
By Martin C. Smith, Atty.

Aug. 16, 1927.
E. R. BURTNETT
INTERNAL COMBUSTION ENGINE
Filed Dec. 16, 1925
1,639,165
2 Sheets-Sheet 2
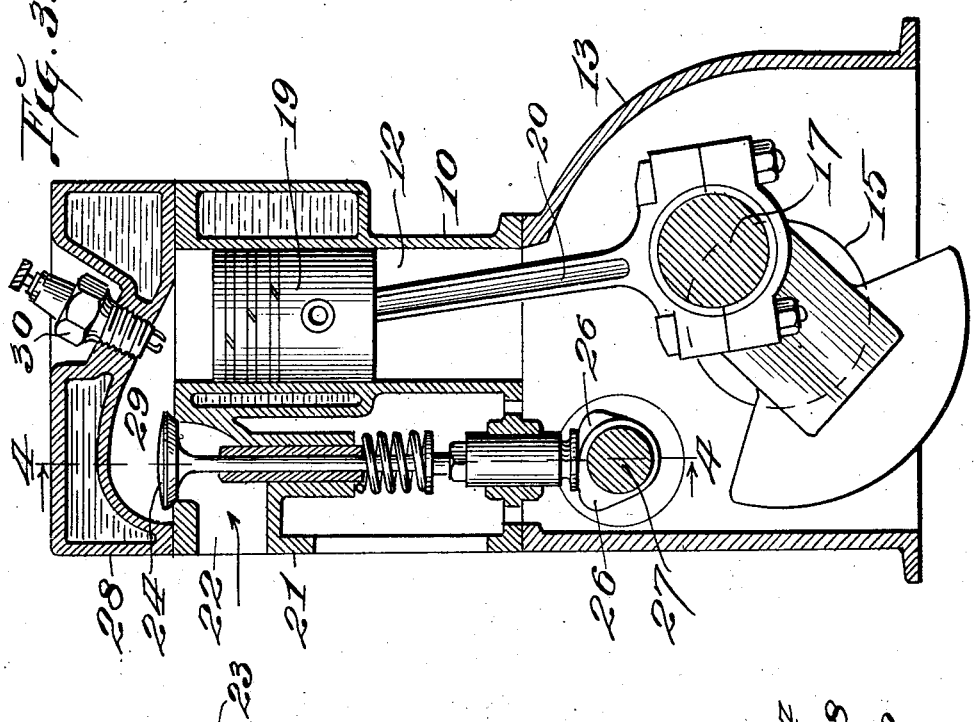
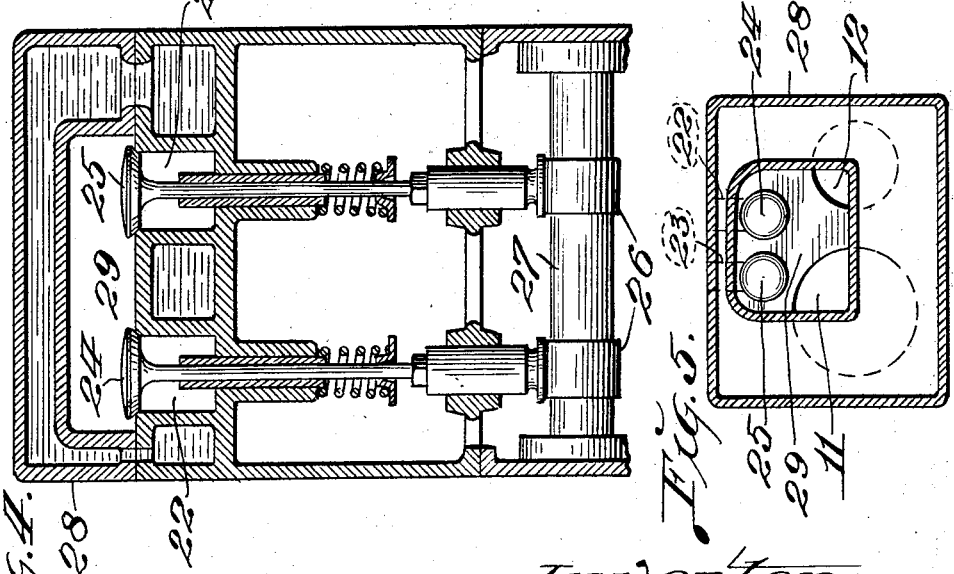
Inventor:—
Everett R. Burtnett
By Martin C. Smith atty.

Patented Aug. 16, 1927.

1,639,16_

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INTERNAL-COMBUSTION ENGINE.

Application filed December 16, 1925. Serial No. 75,703.

My invention relates to an internal combustion engine of the four stroke cycle type and has for its principal objects the provision of a relatively simple and practical engine unit that will produce increased power throughout the load range, to provide an engine structure that will develop a relatively high degree of torque at low engine speeds and also to provide a common compression and combustion clearance chamber that joins two combustion chambers and in which common clearance chamber gaseous fuel charges are compressed and impounded in a very compact condition with the result that a high degree of turbulence of the gaseous fuel charge is developed during compression and thereby providing for a material increase in the speed of the flame propagation through the compressed charge when the latter is ignited.

In the operation of an internal combustion engine, the power developed from combustion before mechanical losses are taken from it and before power out-put after mechanical losses are considered, a primary influence acts between the initial heat power developed during combustion and the pressure resulting that is developed to drive the piston, such influence being the factor of radiation.

The great demand upon the internal combustion engine is for the development of greater torque at low engine revolution, for competitive performance in relation to steam and to obtain this desirable result with economy and low costs of manufacture. Supercharging adds to the power developed from an engine of a given displacement at all engine speeds but supercharging means a lower compression pressure at light load operation as a result of the maximum compression limit being established to the volume ratio of the supercharge, thus bringing about a reduction of the thermal efficiency at light load operation.

A larger engine means increased cost of production, increased mechanical losses, greater heat losses by radiation at light load operation and increased engine weight to propel. In the conventional four stroke cycle engine while operating at full load and low engine speed, a condition produced when the operator of an automobile is endeavoring to travel in high gear when the load is very great or the road conditions will not permit faster travel, the period of time is increased in which expansion is retarded by the slow crank pin movement to a point where piston speed is accelerated and the connecting rod angularity and crank angularity both provide leverage for piston pressure to twist the shaft and increase piston speed. Therefore at low engine speed, the flame propagation being just as fast as at a higher engine speed, the combustion charge is impounded longer at maximum pressure and temperature before the pressure can be effective in power development, owing to the dead center position of the piston and the lack of greater initial piston travel immediately after combustion which would permit instant expansion and power development. Hence the longer duration of time that the hot gases in which the working energy is stored in value in ratio only to their heat are held in contact with the cooled walls and the loss of heat power as a result of radiation.

It is the purpose of my invention to quicken initial expansion in power development by arranging two cylinders to one common compression and combustion chamber, said two cylinders being of different diameters, to separately connect the piston of each cylinder to a separate crank pin of the crank shaft and the crank pin of the crank shaft to which the smaller diameter piston is connected being disposed in the direction of crank shaft rotation in advance of the crank pin to which the piston of larger diameter is connected. This arrangement causes the maximum compression pressure in the common clearance chamber to occur when the larger piston is on dead top center, at which time the smaller piston and respective crank pin are in advance beyond top dead center thereby providing greater crank leverage at a time when maximum pressure and temperature is first developed.

In order to obtain a high rate of combustion, I provide in combination with the two different displacement cylinders a combustion chamber located to the side, which combustion chamber is substantially semi-spherical in form in order to produce turbulence of the charge during compression. This common combustion chamber joins the combustion chambers of different diameters by openings and the pistons are arranged so as to eliminate the space between their respective chambers on compression dead center with only a carbon clearance. The induction of the contents of the two cylinders at high velocity into one chamber at an angle relative to the plane occupied by the axes of the two cylinders develops the desired degree of turbulence of the charge. The ignition device is located adjacent to the head end of the combustion chamber of least diameter so as to cause combustion to begin in that part of the compressed volume that is first to expand into the piston displacement developed by the advance initial stroke of the smaller displacement piston. Inlet and exhaust poppet vaves are provided in the common compression and combustion clearance chamber for controlling the admission of gaseous fuel to the engine and the exhaust of products of combustion therefrom and said valves being actuated in a conventional manner for engines functioning on the four stroke cycle principle.

With the foregoing and other objects in view, my invention consists in certain novel features of construction and arrangement of parts that will hereinafter be more fully described and claimed and illustrated in the accompanying drawings, in which—

Fig. 1. is a vertical section taken lengthwise through the center of an engine of my improved construction and the plane on which said view is taken being coincident with the axes of the two cylinders and the crank shaft.

Figure 2:
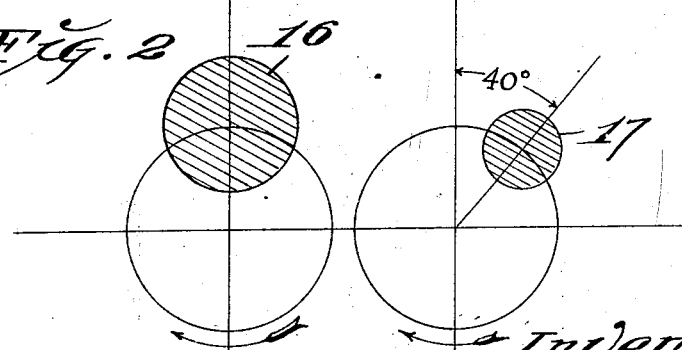

Fig. 2. is a diagrammatic view illustrating the relative angular positions of the two crank throws of the crank shaft to which the two pistons of the engine power unit are connected.

Fig. 3. is a cross section taken approximately on the line 3—3 of Fig. 1.

Fig. 4. is a vertical section taken on the line 4—4 of Fig. 3.

Fig. 5. is a horizontal section taken approximately on the line 5—5 of Fig. 1.

Referring by numerals to the accompanying drawings which illustrate a practical embodiment of my invention, 10 designates a cylinder block in which are formed two combustion chambers 11 and 12, the axes thereof being parallel and the diameter of chamber 11 being somewhat greater than the diameter of combustion chamber 12. If desired, two cylinders of different diameters may be arranged side by side, but as illustrated, I prefer to form the combustion chambers of different diameters in one cylinder block.

Cylinder block 10 surmounts a crank case 13, the latter being provided with bearings 14 for a crank shaft 15. This crank shaft has two throws 16 and 17, the same being arranged respectively in line with the axes of the combustion chambers 11 and 12 and the pin of crank 17 occupies an angular position approximately 40° in advance in the direction of crank shaft rotation from the pin of crank 16.

Pistons 18 and 19 are arranged for operation respectively in the combustion chambers 11 and 12 and said pistons are connected by conventional connecting rods such as 20 to the crank pins of cranks 16 and 17.

Block 10 is provided on its rear portion with a housing 21 in the upper portion of which are formed inlet and exhaust ports 22 and 23 respectively. The inner ends of these ports terminate on the upper surface of block 10 and said inner ends are provided with seats for poppet valves 24 and 25 respectively. These poppet valves are of the conventional type and they are lifted from their seats by cams such as 26 that are formed on a cam shaft 27, the latter being driven in any suitable manner, but preferably from the crank shaft 15 at half the speed of the latter, this being necessary in order that the valves may open and close in proper time relation to the movements of the power pistons 18 and 19. Inlet port 22 and the inlet poppet valve 24 are disposed substantially to the rear of combustion chamber 12 of least diameter while exhaust port 23 and exhaust poppet valve 25 are located substantially to the rear of the combustion chamber 11 of larger diameter.

Secured in any suitable manner on the head end of block 10 and its rearward extension 21 is a head block 28 in the underside of which is formed a shallow recess 29 that connects the head ends of the combustion chambers 11 and 12 and functions as a common compression and combustion clearance chamber therefor.

This common clearance chamber 29 is relatively small in area as compared to the piston sweep portions of combustion chambers 11 and 12 and the greater portion of said chamber 29 is disposed rearwardly of the combustion chambers 11 and 12 so that the forward corners only of the common clearance chamber are in direct communication with the combustion chambers 11 and 12.

This chamber 29 also extends over the inner ends of the inlet and exhaust ports 22 and 23 and provides a space for the upward or opening movements of the poppet valves 24 and 25.

That portion of the chamber 29 that is directly above the poppet valves is substantially dome-shaped with rounded ends so that when a charge of gaseous fuel is admitted to said chamber, it will tend to flow toward the center thereof.

Seated in this head 28 and preferably at a point above the combustion chamber 12 of least diameter is an ignition device such as a spark plug 30 and the inner ends of the electrodes thereof project into the compression and combustion clearance chamber 29.

In the operation of my improved engine the ignition and combustion of a compressed gaseous fuel charge within the clearance chamber 29 is brought about by a spark produced between the inner ends of the electrodes of spark plug 30 and such ignition takes place at the time the piston 18 of larger diameter passes high center, at which time the piston 19 of smaller diameter has moved to a point a short distance below top center, due to the advanced position of crank pin 17 relative to crank pin 16.

As a result of this advanced position of the smaller piston, I am able to take advantage of the greater crank leverage produced at the time when maximum pressure and temperatures are first developed in the ignited charge and consequently a greater degree of torque will be transmitted to the crank shaft. The power and motion thus developed as a result of the ignited fuel charge will be transmitted in the conventional manner through connecting rods 20 and the two cranks to the crank shaft 15 and on the succeeding upward or inward strokes of the two pistons the products of combustion and burnt gases will exhaust through common clearance chamber 29 and through exhaust port 23, which latter is opened as the exhaust valve 25 is lifted from its seat by its respective cam.

On the succeeding downward or outward strokes of the two pistons inlet valve 24 will be opened by its cam and a charge of gaseous fuel will enter inlet port 22 and pass through chamber 29 to the piston sweep chambers above the pistons 18 and 19. On the succeeding upward or inward strokes of the two pistons the fresh gaseous fuel charge thus drawn into the combustion chambers will be compressed in the upper ends of said chambers and within the relatively small shallow common clearance chamber 29 and owing to the size and contour of the latter and its location to the rear of the chambers 11 and 12 the charge of gaseous fuel that is compressed within said chamber will be subjected to a relatively high degree of turbulence, consequently putting said charge in condition to ignite and burn rapidly when a spark is produced between the inner ends of the terminals of the electrodes of spark plug 30.

In this connection it will be understood that where a relatively high degree of turbulence of a compressed gaseous fuel charge is developed during the compression strokes of the pistons the speed of the flame propagation through the compressed charge is materially increased and correspondingly the efficiency of the engine is increased.

Thus it will be seen that I have provided a four stroke cycle internal combustion engine that is relatively simple in construction and which in operation will be highly efficient due to the variable sizes of the combustion chambers, the advanced position of one of the two cranks to which the two pistons of the power unit are connected relative to the other crank, and the size, contour, and location of the common clearance and combustion chamber which, as herein disclosed, is effective in imparting a high degree of turbulence to the compressed gaseous fuel charge.

It will be understood that minor changes in the size, form and construction of the various parts of my improved engine may be made and substituted for those herein shown and described without departing from the spirit of my invention, the scope of which is set forth in the appended claims.

I claim as my invention:

1. In a four stroke cycle internal combustion engine, a pair of combustion cylinders, the chambers within which have different diameters, the head ends of the combustion chambers being connected by a common compression and combustion clearance chamber, the latter being offset laterally with respect to the pair of combustion chambers so that only relatively small portions of said common clearance chamber are in direct communication with said combustion chambers, said common compression and combustion clearance chamber having inlet and exhaust ports, poppet valves controlling said ports, the axes of which poppet valves are parallel with the axes of the combustion chambers, pistons arranged for operation within the combustion chambers of different diameters, a crank shaft having two crank throws to which the two pistons are respectively connected and the pin of the crank throw to which the piston within the combustion chamber of least diameter is connected occupying an angular position in advance in the direction of crank shaft rotation from the pin of the other crank.

2. In a four stroke cycle internal combustion engine, a pair of combustion chambers of different diameters, the head ends of which combustion chambers being connected by a common compression and combustion clearance chamber, the latter being offset with respect to the axes of the pair of combustion chambers, and poppet valve controlled inlet and exhaust ports arranged within said common compression and combustion clearance chamber.

3. In a four stroke cycle internal combustion engine, a pair of combustion chambers of different diameters, the head ends of which combustion chambers being connected by a common compression and combustion clearance chamber, the latter being offset with respect to the axes of the pair of combustion chambers, so that only relatively small portions of said common clearance chamber are in direct communication with the combustion chambers, said offset common compression and combustion clearance chamber being provided with poppet valve controlled inlet and exhaust ports, pistons arranged for operation within the combustion chambers of different diameters, a crank shaft having two throws to which the two pistons are respectively connected and the crank pin of the crank throw to which the piston within the combustion chamber of least diameter is connected occupying an angular position in advance in the direction of crank shaft rotation from the crank pin of the crank.

4. In a four stroke cycle internal combustion engine, a pair of combustion chambers of different diameters, the head ends of which combustion chambers being connected by a common compression and combustion clearance chamber, the latter being offset with respect to the axes of the pair of combustion chambers, so that only relatively small portions of said common clearance chamber are in direct communication with the combustion chambers, poppet valve controlled inlet and exhaust ports arranged within said common compression and combustion clearance chamber, pistons arranged for operation within the combustion chambers of different diameters, a crank shaft having two throws to which the pistons are respectively connected and the crank pin of the crank throw to which the piston within the combustion chamber of least diameter is connected occupying an angular position in advance in the direction of crank shaft rotation from the crank pin of the crank.

5. In a four stroke cycle internal combustion engine, a pair of combustion cylinders, the chambers within which are of different diameters, the head ends of said chambers being connected by a common compression and combustion clearance chamber, the latter being offset laterally from the axes of the two combustion cylinders, so that only relatively small portions of the common clearance chamber are in direct communication with the combustion chambers, poppet valve controlled inlet and exhaust ports communicating with the rear crank side lower portion of said common compression and combustion clearance chamber and an ignition device projecting into said common compression and combustion clearance chamber at a point adjacent to the combustion chamber of greatest diameter and the poppet valve controlled inlet port.

6. In a four stroke cycle internal combustion engine, a pair of combustion cylinders, the chambers within which are of different diameters, the head ends of the chamber within said combustion cylinders being connected by a common compression and combustion clearance chamber, which latter is offset relative to said combustion chambers so that only relatively small portions of said common clearance chamber are in direct communication with said combustion chambers, said common compression and combustion clearance chamber gradually increasing in depth toward its end that is remote from the points where it is in communication with said combustion chambers, pistons arranged for operation within the combustion chambers of different diameters, a crank shaft having two throws to which the pistons within the combustion chambers are respectively connected and the pin of the crank throw to which the piston within the combustion chamber of least diameter is connected being disposed in an angular plane in advance in the direction of crank rotation from the plane occupied by the pin of the other crank throw.

7. In a four stroke cycle internal combustion engine unit, two cylinder chambers joined by a common compression and combustion clearance chamber, a piston within each of the two cylinder chambers commonly joined, a crank shaft with two crank pins to each commonly joined pair of cylinder chambers, the two pistons of the two commonly joined cylinder chambers being separately connected, one to each of the said two crank pins of the crank shaft, the piston stroke displacement of one of the two commonly joined cylinder chambers being less than the piston stroke displacement of the other cylinder chamber of the pair of cylinder chambers commonly joined, the crank pin to which the piston within the cylinder having the least piston stroke displacement being arranged in advance of the other of the two crank pins of the crank shaft to which the piston within the cylinder having the greatest piston stroke displacement is connected, in advance rotatively in the direction of rotation of the crank shaft, the ratio of difference of piston stroke displacement of the two commonly joined cylinders and the ratio of spacing rotatively in degrees between the two crank pins of the crank shaft to which the two pistons of different stroke displacement of the two commonly joined cylinders are connected, being such that the displacement of the clearance chamber common to the said two cylinder chambers will be at minimum when the piston of the greatest piston stroke displacement reaches head end dead center of its stroke and means for admitting the fresh charge and releasing the spent charge in and out of the said two cylinder common clearance chamber.

In testimony whereof I affix my signature.

EVERETT R. BURTNETT.